United States Patent
Lee

(10) Patent No.: US 10,964,969 B2
(45) Date of Patent: Mar. 30, 2021

(54) SECONDARY BATTERY ELECTRODE MANUFACTURING DEVICE INCLUDING ELECTRODE MIXTURE LAYER FORMING MOLD

(71) Applicant: LG Chem, Ltd., Seoul (KR)

(72) Inventor: Myung Ki Lee, Daejeon (KR)

(73) Assignee: LG Chem, Ltd.

( * ) Notice: Subject to any disclaimer, the term of this patent is extended or adjusted under 35 U.S.C. 154(b) by 355 days.

(21) Appl. No.: 15/737,980

(22) PCT Filed: Jul. 21, 2016

(86) PCT No.: PCT/KR2016/007934
§ 371 (c)(1),
(2) Date: Dec. 19, 2017

(87) PCT Pub. No.: WO2017/039148
PCT Pub. Date: Mar. 9, 2017

(65) Prior Publication Data
US 2018/0301737 A1      Oct. 18, 2018

(30) Foreign Application Priority Data

Aug. 31, 2015   (KR) .................. 10-2015-0122688

(51) Int. Cl.
*H01M 10/04*      (2006.01)
*H01M 4/04*       (2006.01)
(Continued)

(52) U.S. Cl.
CPC ......... *H01M 10/0409* (2013.01); *H01M 4/04* (2013.01); *H01M 4/043* (2013.01);
(Continued)

(58) Field of Classification Search
CPC ......... H01M 10/0409; H01M 10/0459; H01M 10/052; H01M 4/04; H01M 4/043; H01M 4/0433; H01M 4/13; H01M 4/621
See application file for complete search history.

(56) References Cited

U.S. PATENT DOCUMENTS 5,238,760 A * 8/1993 Takahashi ............. C04B 35/532
                                                            264/291
5,919,493 A * 7/1999 Sheppard ................. B01J 19/30
                                                           425/174.2
(Continued)

FOREIGN PATENT DOCUMENTS

JP      2003045416 A    2/2003
JP      2007200665 A    8/2007
(Continued)

OTHER PUBLICATIONS

Extended European Search Report for Application No. 16842114.7 dated Mar. 20, 2019, 23 pages.
(Continued)

*Primary Examiner* — Adam A Arciero
(74) *Attorney, Agent, or Firm* — Lerner, David, Littenberg, Krumholz & Mentlik, LLP

(57) ABSTRACT

Disclosed herein is a secondary battery electrode manufacturing device including a slurry supply unit for supplying a secondary battery electrode mixture slurry, an electrode mixture layer forming mold configured to have a hollow structure having a first open surface and a second open surface, the first open surface and the second open surface being opposite each other, the electrode mixture slurry supplied from the slurry supply unit being injected into a hollow region of the electrode mixture layer forming mold, a drying unit for drying the electrode mixture slurry injected into the hollow region of the electrode mixture layer forming mold, a press for pressing the dried electrode mixture slurry
(Continued)

to form an electrode mixture layer sheet, and a mold support unit for supporting the electrode mixture layer forming mold in the state in which the top surface of the mold support unit faces the first open surface of the electrode mixture layer forming mold.

12 Claims, 2 Drawing Sheets

(51) Int. Cl.
    *H01M 10/052* (2010.01)
    *H01M 4/13* (2010.01)
    *H01M 4/62* (2006.01)

(52) U.S. Cl.
    CPC ........... *H01M 4/0433* (2013.01); *H01M 4/13* (2013.01); *H01M 4/621* (2013.01); *H01M 10/0459* (2013.01); *H01M 10/052* (2013.01)

(56) References Cited

U.S. PATENT DOCUMENTS

| | | | | |
|---|---|---|---|---|
| 6,248,139 | B1* | 6/2001 | Kida | H01M 2/0212 |
| | | | | 29/623.2 |
| 2004/0086774 | A1* | 5/2004 | Munoz | H01M 4/0433 |
| | | | | 204/280 |
| 2008/0261111 | A1* | 10/2008 | Shimizu | H01M 4/04 |
| | | | | 429/209 |
| 2012/0132273 | A1 | 5/2012 | Lee et al. | |
| 2014/0227582 | A1 | 8/2014 | Nakashima | |
| 2015/0086875 | A1 | 3/2015 | Yoshida | |

FOREIGN PATENT DOCUMENTS

| | | |
|---|---|---|
| JP | 2008016581 A | 1/2008 |
| JP | 2008218385 A | 9/2008 |
| JP | 2011048967 A | 3/2011 |
| JP | 5509998 B2 | 6/2014 |
| JP | 2014225456 A | 12/2014 |
| KR | 20010107374 A | 12/2001 |
| KR | 100362286 B1 | 11/2002 |
| KR | 20060025312 A | 3/2006 |
| KR | 0583672 B1 | 5/2006 |
| KR | 20060102440 A | 9/2006 |
| KR | 20090118588 A | 11/2009 |
| KR | 20100127721 A | 12/2010 |
| KR | 1101148 B1 | 12/2011 |
| KR | 20140112624 A | 9/2014 |
| KR | 1540618 B1 | 7/2015 |
| WO | 2013031889 A1 | 3/2013 |

OTHER PUBLICATIONS

Search report from International Application No. PCT/KR2016/007934, dated Oct. 12, 2016.

* cited by examiner

[FIG. 1]
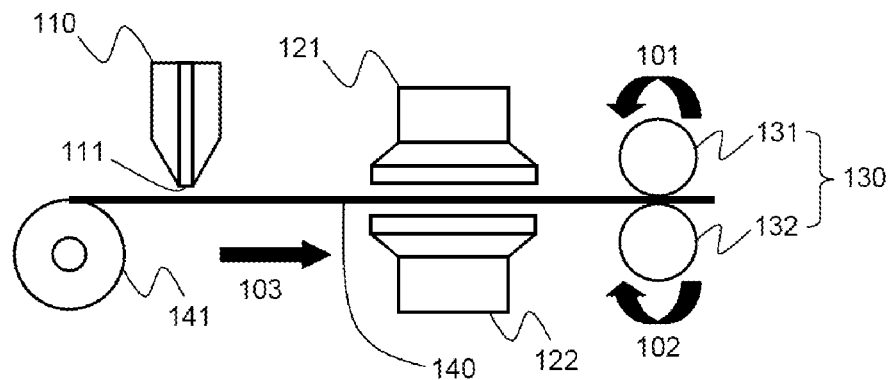
[FIG. 2]
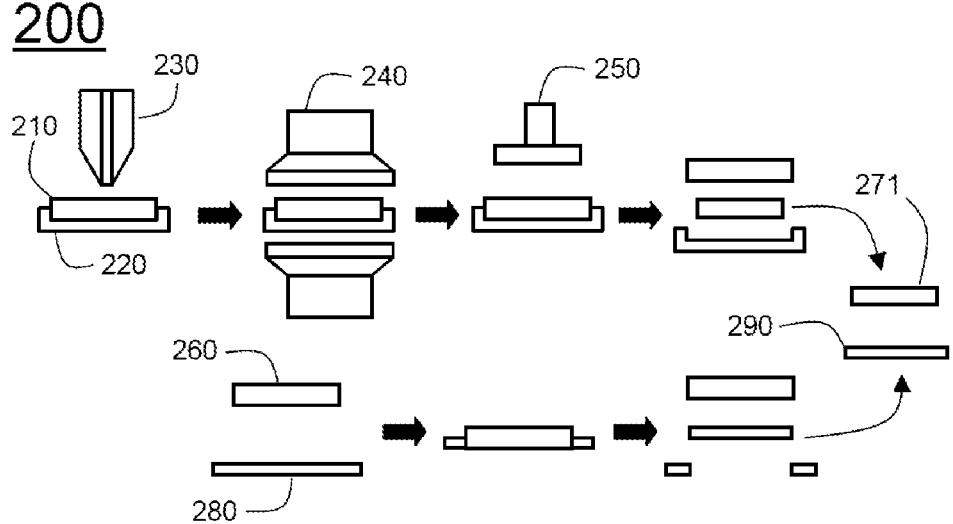

[FIG. 3]
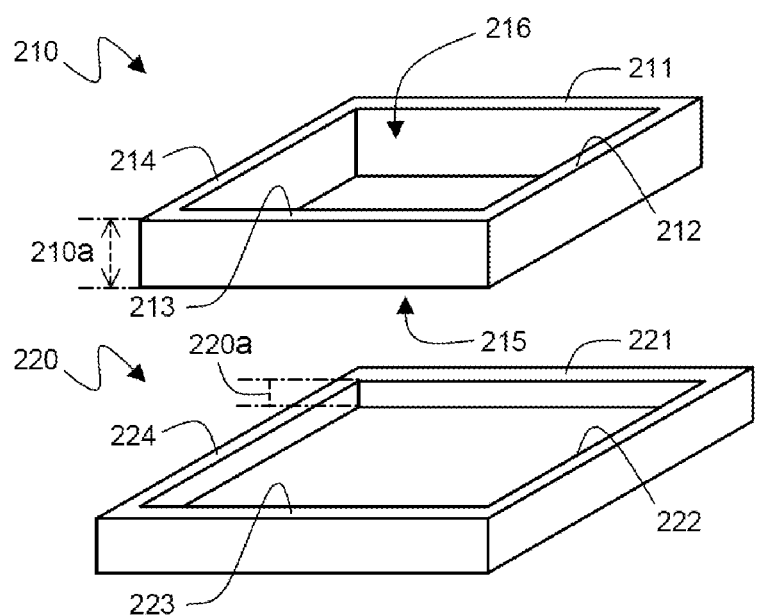
[FIG. 4]
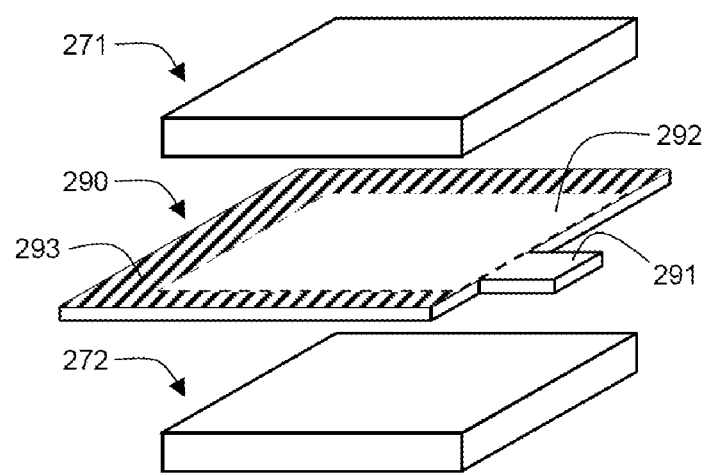

SECONDARY BATTERY ELECTRODE MANUFACTURING DEVICE INCLUDING ELECTRODE MIXTURE LAYER FORMING MOLD

CROSS-REFERENCE TO RELATED APPLICATIONS

The present application is a national phase entry under 35 U.S.C. § 371 of International Application No. PCT/KR2016/007934, filed on Jul. 21, 2016, which claims priority to Korean Patent Application No. 10-2015-0122688 filed on Aug. 31, 2015 with the Korean Intellectual Property Office, the disclosures of which are herein incorporated by reference in its entirety.

TECHNICAL FIELD

The present invention relates to a secondary battery electrode manufacturing device including an electrode mixture layer forming mold.

BACKGROUND

As energy prices are increasing due to the depletion of fossil fuels and increasing attention is being paid to environmental pollution, the demand for environmentally-friendly alternative energy sources is bound to play an increasing role in the future. Thus, research into techniques for generating various kinds of power, such as nuclear energy, solar energy, wind energy, and tidal power, is underway, and power storage apparatuses for more efficient use of the generated energy are also drawing much attention.

In particular, the demand for batteries as energy sources is rapidly increasing as mobile device technology continues to develop and the demand for such mobile devices continues to increase. Accordingly, much research on batteries satisfying various needs has been carried out.

In terms of the shape of batteries, the demand for prismatic secondary batteries or pouch type secondary batteries, which are thin enough to be applied to products, such as mobile phones, is very high. In terms of the material for batteries, on the other hand, the demand for lithium secondary batteries, such as lithium ion batteries and lithium ion polymer batteries, which exhibit high energy density, discharge voltage, and output stability, is very high.

In addition, secondary batteries may be classified based on the structure of an electrode assembly having a structure in which a positive electrode and a negative electrode are stacked in the state in which a separator is interposed between the positive electrode and the negative electrode. For example, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which pluralities of positive electrodes and negative electrodes each having a predetermined size are sequentially stacked in the state in which separators are disposed respectively between the positive electrodes and the negative electrodes. In recent years, in order to solve problems caused by the jelly-roll type electrode assembly and the stacked type electrode assembly, there has been developed a stacked/folded type electrode assembly, which is a combination of the jelly roll type electrode assembly and the stacked type electrode assembly, having an improved structure in which predetermined numbers of positive electrodes and negative electrodes are sequentially stacked in the state in which separators are disposed respectively between the positive electrodes and the negative electrodes to constitute a unit cell, after which a plurality of unit cells is sequentially folded in the state of having been placed on a separation film.

In addition, based on the shape of the battery case of each of the secondary batteries, the secondary batteries may be classified into a cylindrical battery configured to have a structure in which an electrode assembly is mounted in a cylindrical metal container, a prismatic battery configured to have a structure in which an electrode assembly is mounted in a prismatic metal container, and a pouch type battery configured to have a structure in which an electrode assembly is mounted in a pouch type case made of an aluminum laminate sheet.

Particularly, in recent years, much attention has been paid to a pouch type battery configured to have a structure in which such a stacked or stacked/folded type electrode assembly is mounted in a pouch type battery case made of an aluminum laminate sheet because of low manufacturing costs, light weight, easy modification of the shape thereof, etc. In addition, the use of such a pouch type battery has gradually increased.

In general, a secondary battery electrode is manufactured by applying a mixture of an electrode active material, a conductive agent, and a binder to an electrode current collector and then drying and pressing the mixture.

FIG. 1 is a typical view schematically showing the structure of a conventional electrode sheet manufacturing device.

Referring to FIG. 1, an electrode sheet manufacturing device 100 includes a transfer unit 130, a slot die 110 for coating an electrode mixture slurry, and a drying unit 121 and 122.

An electrode current collector sheet 140 is wound in the form of a roll 141. The electrode current collector sheet 140 is transferred by the transfer unit 130, which is located opposite the roll 141.

The transfer unit 130 includes two rollers 131 and 132. The rollers 131 and 132 are rotated in opposite directions, as indicated by arrows 101 and 102, to transfer the electrode current collector sheet 140 toward the transfer unit 130, as indicated by an arrow 103.

The slot die 110 has a slot 111, which is a gap between two divided parts of the slot die 110. A coating liquid is discharged through the slot 111 formed in the slot die 110 in the manner in which ink is discharged through the point of a fountain pen. While the electrode current collector sheet 140 is transferred, an electrode mixture slurry discharged from the slot die 110 is applied to the electrode current collector sheet 140. The coating method using the slot die 110 is superior to other coating methods in terms of maintenance and productivity. For this reason, the coating method using the slot die 110 is widely used in the manufacture of a flat panel display panel, in addition to the application of the electrode mixture slurry to the electrode current collector sheet 140.

The electrode current collector sheet 140, to which the electrode mixture slurry has been applied, is transferred to the drying unit 121 and 122, as indicated by the arrow 103.

The drying unit 121 and 122 is configured to dry opposite major surfaces of the electrode current collector sheet 140, to which the electrode mixture slurry has been applied, using hot air or a light source to manufacture an electrode sheet.

The manufactured electrode sheet is cut to a desired size to manufacture an electrode, which constitutes an electrode assembly.

In the conventional electrode sheet manufacturing device 100, however, a portion of the electrode sheet having a predetermined length is dried by the drying unit 121 and 122. In the case in which the amount of the electrode mixture slurry that is coated on the electrode current collector sheet 140 is large, the coated portion of the electrode sheet may be cracked. As a result, the increase in the capacity of the electrode that can be achieved by increasing the amount of the electrode mixture slurry that is coated on the electrode current collector sheet is limited.

In addition, the electrode mixture slurry is applied to the electrode current collector sheet 140 in the state in which the electrode mixture slurry is a liquid. If the viscosity of the electrode mixture slurry is lower than a predetermined level, therefore, it may be difficult to apply a desired amount of the electrode mixture slurry to the electrode current collector sheet 140.

Furthermore, the electrode sheet is wound in the form of a roll before the electrode sheet is cut to a desired size after the process of coating the electrode mixture slurry is completed. Even if a large amount of the electrode mixture slurry is applied to the electrode current collector sheet 140, therefore, the electrode mixture slurry may be separated from the electrode current collector sheet 140 due to the difference in physical properties between the electrode mixture slurry and the electrode current collector sheet 140 when the electrode sheet is wound.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in the case in which a secondary battery electrode manufacturing device is configured so as to include an electrode mixture layer forming mold, into which an electrode mixture slurry is injected and molded, as will be described hereinafter, an electrode mixture layer sheet, separately manufactured by the electrode mixture layer forming mold, is attached to an electrode current collector that is cut so as to have a predetermined length, whereby it is possible to more easily manufacture an electrode mixture layer having a large amount of the electrode mixture slurry coated thereon. In addition, the force of adhesion between the electrode mixture layer and the electrode current collector may be increased, compared with the case in which a current collector sheet is directly coated with the electrode mixture. Consequently, it is possible to improve the structural stability of a secondary battery electrode. Furthermore, the electrode mixture layer is prevented from cracking, thereby reducing the product defect rate and thus improving the reliability of processing. The present invention has been completed based on these findings.

Technical Solution

In accordance with one aspect of the present invention, the above and other objects can be accomplished by the provision of a secondary battery electrode manufacturing device including a slurry supply unit for supplying a secondary battery electrode mixture slurry, an electrode mixture layer forming mold configured to have a hollow structure having a first open surface and a second open surface, the first open surface and the second open surface being opposite each other, the electrode mixture slurry supplied from the slurry supply unit being injected into a hollow region of the electrode mixture layer forming mold, a drying unit for drying the electrode mixture slurry injected into the hollow region of the electrode mixture layer forming mold, a press for pressing the dried electrode mixture slurry to form an electrode mixture layer sheet, and a mold support unit for supporting the electrode mixture layer forming mold in the state in which the top surface of the mold support unit faces the first open surface of the electrode mixture layer forming mold.

The electrode mixture layer sheet, separately manufactured by the electrode mixture layer forming mold, is attached to an electrode current collector that is cut so as to have a predetermined length. Consequently, it is possible to more easily manufacture an electrode mixture layer having a large amount of the electrode mixture slurry coated thereon. In addition, the force of adhesion between the electrode mixture layer and the electrode current collector may be increased, compared with the case in which a current collector sheet is directly coated with the electrode mixture. Consequently, it is possible to improve the structural stability of a secondary battery electrode. Furthermore, the electrode mixture layer is prevented from cracking, thereby reducing the product defect rate and thus improving the reliability of processing.

In a concrete example, the electrode mixture slurry may be injected through the second open surface of the electrode mixture layer forming mold.

More specifically, the electrode mixture layer forming mold may be configured to have a hollow structure having a first open surface and a second open surface, the first open surface and the second open surface being opposite each other, and the first surface of the electrode mixture layer forming mold may face the top surface of the mold support unit.

As a result, only the second surface of the electrode mixture layer forming mold remains open. Consequently, the electrode mixture slurry injected through the second surface of the electrode mixture layer forming mold is prevented from being discharged to the outside through the first surface of the electrode mixture layer forming mold.

In addition, the hollow region of the electrode mixture layer forming mold may be formed to have a circular, oval, triangular, quadrangular, or polygonal planar shape. However, the present invention is not limited thereto. The shape of the hollow region of the electrode mixture layer forming mold is not particularly restricted so long as it does not incur too much time or expense to manufacture the electrode mixture layer forming mold and, in addition, the structure of the electrode mixture layer forming mold is appropriately chosen in view of various shapes of battery cells to which the electrode manufactured by the secondary battery electrode manufacturing device is applied and devices to which the battery cells are applied.

Meanwhile, the material for the electrode mixture layer forming mold is not particularly restricted as long as the electrode mixture layer forming mold is formed so as to have a hollow structure of a desired shape and size. Specifically, the electrode mixture layer forming mold may be made of a metal, a heat-resistant polymer resin, or a polymer composite.

In this case, the heat-resistant polymer resin or the polymer composite may have a melting point of 130° C. to 400° C.

More specifically, the electrode mixture slurry is injected into the electrode mixture layer forming mold in the state in which the electrode mixture slurry is a high-temperature liquid. Since the heat-resistant polymer resin or the polymer composite, of which the electrode mixture layer forming mold is made, has a melting point of 130° C. to 400° C., the electrode mixture layer forming mold exhibits heat resistance within the temperature range of the electrode mixture slurry. Consequently, it is possible for the electrode mixture layer forming mold to stably support the electrode mixture slurry in the process of forming the electrode mixture layer sheet.

The kind of drying unit is not particularly restricted as long as the drying unit effectively dries the electrode mixture slurry injected into the hollow region of the electrode mixture layer forming mold. In a concrete example, the drying unit may dry the electrode mixture slurry using hot air or a light source.

In this case, the temperature of the hot air or the light source may be appropriately adjusted depending on the amount of the electrode mixture slurry that is injected and the temperature of the electrode mixture slurry within a range in which the electrode mixture slurry is effectively dried while the characteristics of the electrode mixture slurry are not changed.

In addition, the press may press the dried electrode mixture slurry through the second open surface of the electrode mixture layer forming mold.

As previously described, the first surface and the second surface of the electrode mixture layer forming mold are open, and the first surface of the electrode mixture layer forming mold faces the mold support unit. Consequently, the press may press the dried electrode mixture slurry through the second open surface of the electrode mixture layer forming mold, into which the electrode mixture slurry has been injected, whereby it is possible to manufacture an electrode mixture layer sheet having desired energy density and/or porosity.

The shape of the outside of a region of the press that faces the electrode mixture slurry may correspond to the shape of the inside of the second open surface of the electrode mixture layer forming mold such that the press presses the dried electrode mixture slurry while being introduced into the electrode mixture layer forming mold.

In other words, the press presses the electrode mixture slurry through the second surface of the electrode mixture layer forming mold. To this end, the shape of the outside of the region of the press that faces the electrode mixture slurry may correspond to the shape of the inside of the second open surface of the electrode mixture layer forming mold. Consequently, the press may press the electrode mixture slurry, which has been introduced into the inside, i.e. the hollow region, of the electrode mixture layer forming mold and then dried, through the second surface of the electrode mixture layer forming mold.

Meanwhile, the electrode mixture layer sheet may be separated from the electrode mixture layer forming mold and the mold support unit after the electrode mixture slurry is pressed.

That is, the electrode mixture layer sheet includes no current collector. Consequently, the electrode mixture layer sheet may be separated from the electrode mixture layer forming mold and the mold support unit after the electrode mixture slurry is pressed such that the electrode mixture layer sheet is applied to the current collector.

A predetermined separating agent may be added to the top surface of the mold support unit, which supports the first surface of the electrode mixture layer forming mold, such that the manufactured electrode mixture layer sheet can be more easily separated from the mold support unit.

In a concrete example, the secondary battery electrode manufacturing device may further include a current collector cutting unit for cutting a current collector sheet to manufacture an electrode current collector.

In the case in which the electrode mixture layer sheet is formed on the current collector or the current collector sheet, the current collector or the current collector sheet may be damaged or deformed due to the high pressure applied the electrode mixture slurry by the press.

Furthermore, the current collector sheet is a single continuous sheet, which may be damaged or deformed by tensile force applied thereto when the electrode mixture layer sheet is attached to the current collector sheet.

The secondary battery electrode manufacturing device according to the present invention may further include a current collector cutting unit for cutting a current collector sheet to manufacture an electrode current collector. Consequently, it is possible to prevent the occurrence of problems which may be caused when the electrode mixture layer sheet is attached to the current collector sheet.

In this case, the planar area of each major surface of the electrode current collector may be larger than the planar area of the electrode mixture layer sheet, and the electrode mixture layer sheet may be attached to the central region of each major surface of the electrode current collector.

More specifically, the electrode current collector is disposed between electrode mixture layer sheets having the same polarities. After the electrode mixture layer sheet is are attached to the central region of each major surface of the electrode current collector, which has a larger area than the electrode mixture layer sheets, the remaining region of the electrode current collector is removed such that the electrode current collector has the same area as the electrode mixture layer sheets.

The area of each major surface of the electrode current collector may be 110% to 130% of the area of the electrode mixture layer sheet.

If the area of each major surface of the electrode current collector is less than 110% of the area of the electrode mixture layer sheet, it may be difficult to attach the electrode mixture layer sheet to the central region of each major surface of the electrode current collector. As a result, it may take much more time to manufacture the electrode.

On the other hand, if the area of each major surface of the electrode current collector is greater than 130% of the area of the electrode mixture layer sheet, the electrode current collector may be damaged or deformed by the tensile force applied to the electrode current collector when the electrode mixture layer sheet is attached to each major surface of the electrode current collector. In addition, the remaining region of the electrode current collector that will be removed is excessively increased, with the result that the cost of manufacturing the electrode is increased.

Meanwhile, the manner or structure in which the electrode mixture layer sheet is attached to each major surface of the electrode current collector is not particularly restricted so long as the electrode current collector is not damaged or deformed and the electrode mixture layer sheets are attached to the electrode current collector with a desired force of adhesion. Specifically, the electrode mixture layer sheet may be attached to each major surface of the electrode current collector using a binder.

In addition, the electrode current collector may have an electrode tab formed on at least one side thereof. After the electrode mixture layer sheet is attached to each major surface of the electrode current collector, the remaining region of the electrode current collector, excluding the central region of the electrode current collector and the electrode tab, may be removed.

Consequently, an electrode may be manufactured so as to have a structure in which the electrode current collector has an electrode tab, and the electrode current collector, excluding the electrode tab, may have the same area as the electrode mixture layer sheet.

In accordance with another aspect of the present invention, there is provided a secondary battery electrode manufacturing method using the secondary battery electrode manufacturing device, the secondary battery electrode manufacturing method including a) placing an electrode mixture layer forming mold on the top surface of a mold support unit such that a first open surface of the electrode mixture layer forming mold faces the top surface of the mold support unit, b) injecting an electrode mixture slurry into a hollow region of the electrode mixture layer forming mold, c) drying the electrode mixture slurry injected into the hollow region of the electrode mixture layer forming mold, d) pressing the dried electrode mixture slurry to form an electrode mixture layer sheet, e) separating the electrode mixture layer sheet from the electrode mixture layer forming mold and the mold support unit, f) cutting a current collector sheet to manufacture an electrode current collector, g) attaching the electrode mixture layer sheet to a central region of each major surface of the electrode current collector, and h) removing the remaining region of the electrode current collector, excluding the central region of the electrode current collector and an electrode tab formed on at least one side of the electrode current collector, to manufacture an electrode.

That is, the secondary battery electrode manufacturing method is characterized in that the electrode mixture layer sheet having a large amount of the electrode mixture slurry coated thereon and the electrode current collector are manufactured separately, after which the manufactured electrode mixture layer sheet is attached to the electrode current collector to manufacture the electrode.

In the secondary battery electrode manufacturing method, therefore, it is possible to more easily manufacture an electrode mixture layer having a large amount of an electrode mixture slurry coated thereon. Consequently, it is possible to improve the structural stability of a secondary battery electrode. Furthermore, the electrode mixture layer is prevented from cracking, thereby reducing the product defect rate and thus improving the reliability of processing.

In accordance with another aspect of the present invention, there is provided a secondary battery electrode manufactured using the secondary battery electrode manufacturing method. The electrode may be a positive electrode or a negative electrode.

That is, the electrode according to the present invention may be applied as either a positive electrode or a negative electrode, irrespective of the polarity of the electrode, as long as the electrode has a large amount of the electrode mixture slurry coated thereon.

In accordance with other aspects of the present invention, there are provided a battery cell including the electrode and a device including the battery cell. The battery cell and the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view schematically showing the structure of a conventional electrode sheet manufacturing device;

FIG. 2 is a typical view schematically showing the structure of a secondary battery electrode manufacturing device according to an embodiment of the present invention;

FIG. 3 is a typical view schematically showing the structures of an electrode mixture layer forming mold and a mold support unit of FIG. 2; and FIG. 4 is a typical view schematically showing a process of attaching electrode mixture layer sheets, manufactured by the secondary battery electrode manufacturing device of FIG. 2, to an electrode current collector.

DETAILED DESCRIPTION OF THE EMBODIMENT

Now, exemplary embodiments of the present invention will be described in detail with reference to the accompanying drawings. It should be noted, however, that the scope of the present invention is not limited by the illustrated embodiments.

FIG. 2 is a typical view schematically showing the structure of a secondary battery electrode manufacturing device according to an embodiment of the present invention.

Referring to FIG. 2, a secondary battery electrode manufacturing device 200 includes a slurry supply unit 230, an electrode mixture layer forming mold 210, drying units 240, a press 250, a mold support unit 220, and a current collector cutting unit 260.

A secondary battery electrode mixture slurry supplied from the slurry supply unit 230 is injected into a hollow region of the electrode mixture layer forming mold 210 in the state in which a first surface of the electrode mixture layer forming mold 210 faces the top surface of the mold support unit 220.

The electrode mixture slurry, injected into the hollow region of the electrode mixture layer forming mold 210, is dried by the drying units 240, which are located above the electrode mixture layer forming mold 210 and under the mold support unit 220. The dried electrode mixture slurry is pressed by the press 250. As a result, an electrode mixture layer sheet 271 is manufactured.

The manufactured electrode mixture layer sheet 271 is separated from the electrode mixture layer forming mold 210 and the mold support unit 220.

The current collector cutting unit 260 cuts a long current collector sheet 280 to manufacture an electrode current collector 290.

The manufactured electrode mixture layer sheet 271 is attached to the electrode current collector 290. As a result, a secondary battery electrode is manufactured.

In the secondary battery electrode manufacturing device according to the present invention, as described above, an electrode mixture layer sheet having a large amount of an electrode mixture slurry coated thereon and an electrode current collector are manufactured separately, and then the manufactured electrode mixture layer sheet is attached to the electrode current collector, whereby it is possible to more easily manufacture a secondary battery electrode including the electrode mixture layer having a large amount of the electrode mixture slurry coated thereon.

FIG. 3 is a typical view schematically showing the structures of the electrode mixture layer forming mold and the mold support unit of FIG. 2.

Referring to FIG. 3, the electrode mixture layer forming mold 210 is configured to have a hollow structure in which a first surface 215 and a second surface 216 opposite the first surface 215 are open. The hollow region of the electrode mixture layer forming mold 210 is defined by four side walls 211, 212, 213, and 214.

The mold support unit 220 has four side walls 221, 222, 223, and 224 protruding upward from the top surface of the mold support unit 220 that faces the first open surface 215 of the electrode mixture layer forming mold 210.

The side walls 221, 222, 223, and 224 of the mold support unit 220 surround the lower parts of the outsides of the side walls 211, 212, 213, and 214 of the electrode mixture layer forming mold 210. The height 220a of each of the side walls 221, 222, 223, and 224 of the mold support unit 220 is lower than the height 210a of each of the side walls 211, 212, 213, and 214 of the electrode mixture layer forming mold 210.

As a result, the first surface 215 of the electrode mixture layer forming mold 210 may be stably closed by the top surface of the mold support unit 220. In addition, the movement of the electrode mixture layer forming mold 210 may be prevented when the electrode mixture slurry is pressed by the press 250.

Furthermore, in the above structure, the electrode mixture layer forming mold 210 may be easily separated from the mold support unit 220 by a worker or a working tool or equipment. Consequently, the electrode mixture layer sheet, which is manufactured by pressing the electrode mixture layer, may be easily separated from the electrode mixture layer forming mold 210 and the mold support unit 220.

FIG. 4 is a typical view schematically showing a process of attaching electrode mixture layer sheets, manufactured by the secondary battery electrode manufacturing device of FIG. 2, to the electrode current collector.

Referring to FIG. 4, electrode mixture layer sheets 271 and 271 are attached to the top surface and the bottom surface of the electrode current collector 290, respectively.

The electrode current collector 290 has an electrode tab 291 protruding from one side thereof. The planar area of the electrode current collector 290 is larger than that of each of the electrode mixture layer sheets 271 and 271.

The electrode mixture layer sheets 271 and 271 are attached to the top surface and the bottom surface of a central region 292 of the electrode current collector 290, respectively, in the state in which the electrode mixture layer sheets 271 and 271 are aligned with the side of the electrode current collector 290 on which the electrode tab 291 is formed.

After the electrode mixture layer sheets 271 and 271 are attached to the top surface and the bottom surface of the electrode current collector 290, respectively, the remaining region 293 of the electrode current collector 290, excluding the central region 292 of the electrode current collector 290 and the electrode tab 291, is removed. As a result, a secondary battery electrode is finally manufactured.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

As is apparent from the above description, a secondary battery electrode manufacturing device according to the present invention is configured so as to include an electrode mixture layer forming mold, into which an electrode mixture slurry is injected and molded. An electrode mixture layer sheet separately manufactured by the electrode mixture layer forming mold is attached to an electrode current collector that is cut so as to have a predetermined length. Consequently, it is possible to more easily manufacture an electrode mixture layer having a large amount of the electrode mixture slurry coated thereon. In addition, the force of adhesion between the electrode mixture layer and the electrode current collector may be increased, compared with the case in which a current collector sheet is directly coated with the electrode mixture. Consequently, it is possible to improve the structural stability of a secondary battery electrode. Furthermore, the electrode mixture layer is prevented from cracking, thereby reducing the product defect rate and thus improving the reliability of processing.

The invention claimed is:

1. A secondary battery electrode manufacturing device comprising:
   a slurry supply unit for supplying a secondary battery electrode mixture slurry;
   an electrode mixture layer forming mold configured to have a hollow structure having a first open surface and a second open surface, the first open surface and the second open surface being opposite each other, the electrode mixture slurry supplied from the slurry supply unit being injected into a hollow region of the electrode mixture layer forming mold;
   a drying unit for drying the electrode mixture slurry injected into the hollow region of the electrode mixture layer forming mold;
   a press for pressing the dried electrode mixture slurry to form an electrode mixture layer sheet; and
   a mold support unit for supporting the electrode mixture layer forming mold in a state in which a top surface of the mold support unit faces the first open surface of the electrode mixture layer forming mold,
   wherein the press presses the dried electrode mixture slurry through the second open surface of the electrode mixture layer forming mold, and
   wherein a shape of an outside of a region of the press that faces the electrode mixture slurry corresponds to a shape of an inside of the second open surface of the electrode mixture layer forming mold such that the press presses the dried electrode mixture slurry while being introduced into the electrode mixture layer forming mold.

2. The secondary battery electrode manufacturing device according to claim 1, wherein the electrode mixture slurry is injected through the second open surface of the electrode mixture layer forming mold.

3. The secondary battery electrode manufacturing device according to claim 1, wherein the hollow region of the electrode mixture layer forming mold is formed to have a circular, oval, triangular, quadrangular, or polygonal planar shape.

4. The secondary battery electrode manufacturing device according to claim 1, wherein the electrode mixture layer forming mold is made of a metal, a heat-resistant polymer resin, or a polymer composite.

5. The secondary battery electrode manufacturing device according to claim 4, wherein the heat-resistant polymer resin or the polymer composite has a melting point of 130° C. to 400° C.

6. The secondary battery electrode manufacturing device according to claim 1, wherein the drying unit dries the electrode mixture slurry using air or a light source.

7. The secondary battery electrode manufacturing device according to claim 1, wherein the electrode mixture layer sheet is separated from the electrode mixture layer forming mold and the mold support unit after the electrode mixture slurry is pressed.

8. The secondary battery electrode manufacturing device according to claim 1, further comprising a current collector cutting unit for cutting a current collector sheet to manufacture an electrode current collector.

9. A secondary battery electrode manufacturing method using a secondary battery electrode manufacturing device according to claim 1, the secondary battery electrode manufacturing method comprising:
   a) placing an electrode mixture layer forming mold on a top surface of a mold support unit such that a first open surface of the electrode mixture layer forming mold faces the top surface of the mold support unit;
   b) injecting an electrode mixture slurry into a hollow region of the electrode mixture layer forming mold;
   c) drying the electrode mixture slurry injected into the hollow region of the electrode mixture layer forming mold;
   d) pressing the dried electrode mixture slurry to form an electrode mixture layer sheet;
   e) separating the electrode mixture layer sheet from the electrode mixture layer forming mold and the mold support unit;
   f) cutting a current collector sheet to manufacture an electrode current collector;
   g) attaching the electrode mixture layer sheet to a central region of each major surface of the electrode current collector; and
   h) removing a remaining region of the electrode current collector, excluding the central region of the electrode current collector and an electrode tab formed on at least one side of the electrode current collector, to manufacture an electrode.

10. A secondary battery electrode manufactured using a secondary battery electrode manufacturing method according to claim 9.

11. The secondary battery electrode manufacturing method according to claim 10, wherein the electrode is a positive electrode or a negative electrode.

12. A battery cell comprising an electrode according to claim 10.

* * * * *